US012732859B2

(12) United States Patent
Hart et al.

(10) Patent No.: US 12,732,859 B2
(45) Date of Patent: Sep. 8, 2026

(54) STREAM CLASSIFICATION WITH MULTIPLE QUALITY TIERS

(71) Applicant: Cisco Technology, Inc., San Jose, CA (US)

(72) Inventors: Brian D. Hart, Sunnyvale, CA (US); Binita Gupta, San Diego, CA (US); Sukanya Nutakki, Frisco, TX (US); Malcolm M. Smith, Richardson, TX (US); Venkataprasad Chirreddy, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 33 days.

(21) Appl. No.: 18/633,304

(22) Filed: Apr. 11, 2024

(65) Prior Publication Data

US 2025/0220495 A1 Jul. 3, 2025

Related U.S. Application Data

(60) Provisional application No. 63/615,654, filed on Dec. 28, 2023.

(51) Int. Cl.
*H04W 28/02* (2009.01)

(52) U.S. Cl.
CPC .............................. *H04W 28/0268* (2013.01)

(58) Field of Classification Search
CPC . H04W 28/0268; H04W 28/24; H04W 72/04; H04W 72/12; H04W 84/12; H04L 47/24; H04L 47/70
See application file for complete search history.

(56) References Cited

U.S. PATENT DOCUMENTS

| | | | | |
|---|---|---|---|---|
| 7,881,196 | B2 * | 2/2011 | Bader | H04L 47/826 370/234 |
| 9,648,148 | B2 * | 5/2017 | Rimmer | H04L 69/22 |
| 9,747,176 | B2 * | 8/2017 | Oppermann | G06F 11/203 |
| 11,115,873 | B1 * | 9/2021 | Smith | H04L 47/24 |
| 12,470,952 | B2 * | 11/2025 | Panchal | H04B 7/0452 |
| 12,574,838 | B2 * | 3/2026 | Eisen | H04W 28/0268 |
| 2007/0115843 | A1 * | 5/2007 | Bader | H04L 47/805 370/235 |

(Continued)

OTHER PUBLICATIONS

Bouraqia, Khadija, et al. "Quality of experience for streaming services: measurements, challenges and insights." IEEE Access 8 (2020): 13341-13361.*

(Continued)

*Primary Examiner* — Jimmy H Tran
(74) *Attorney, Agent, or Firm* — Patterson + Sheridan, LLP

(57) ABSTRACT

Techniques for modifying quality of service (QOS) for wireless communication. These techniques include identifying a plurality of QoS levels for an application flow between a wireless access point (AP) and a wireless station (STA), each of the QoS levels defining a plurality of QoS characteristics for the application flow. The techniques further include establishing a first QoS level, of the plurality of QoS levels, for the application flow, based on the identified plurality of QoS levels. The techniques further include modifying the QoS level for the application flow from the first QoS level to a second QoS level, of the plurality of QoS levels, based on selecting between the identified plurality of QoS levels.

18 Claims, 6 Drawing Sheets

(56) References Cited

U.S. PATENT DOCUMENTS

2015/0180782 A1* 6/2015 Rimmer ................ H04L 49/358 370/235
2015/0180790 A1* 6/2015 Rimmer ................ H04L 47/765 370/429
2015/0186226 A1* 7/2015 Oppermann ........ G06F 11/1469 714/6.23
2015/0222533 A1* 8/2015 Birrittella ............... H04L 49/25 370/392
2016/0028595 A1* 1/2016 Ramakrishnan ........ H04L 65/60 709/226
2017/0237671 A1* 8/2017 Rimmer ................ H04L 49/111 370/235
2020/0383006 A1 12/2020 Trivisonno et al.
2021/0282056 A1* 9/2021 Smith ..................... H04L 47/24
2022/0007236 A1* 1/2022 Canpolat ............... H04W 84/12
2022/0272566 A1 8/2022 Nayak et al.
2022/0408303 A1* 12/2022 Zhou ................. H04W 28/0268
2023/0117842 A1 4/2023 Xin et al.
2023/0127299 A1* 4/2023 Eisen ................ H04W 28/0268 370/338
2023/0180052 A1* 6/2023 Haider .............. H04W 28/0268 370/235
2023/0239778 A1* 7/2023 Doostnejad ....... H04L 27/26025 370/329
2023/0284106 A1* 9/2023 Teyeb ............... H04W 36/0069 370/331
2023/0318758 A1 10/2023 Ajami et al.
2023/0379749 A1 11/2023 Canpolat et al.
2023/0422305 A1* 12/2023 Das ................... H04W 74/0816
2024/0098018 A1* 3/2024 Li ......................... H04L 45/302
2024/0430706 A1* 12/2024 Panchal ............... H04B 7/0452
2026/0101201 A1* 4/2026 Panchal ............... H04B 7/0452

OTHER PUBLICATIONS

Barakabitze, Alcardo Alex, et al. "QoE management of multimedia streaming services in future networks: A tutorial and survey." IEEE Communications Surveys & Tutorials 22.1 (2019): 526-565.*

International Search Report and Written Opinion for International Application No. PCT/US2024/062164, mailed Apr. 3, 2025, 13 Pages.

* cited by examiner

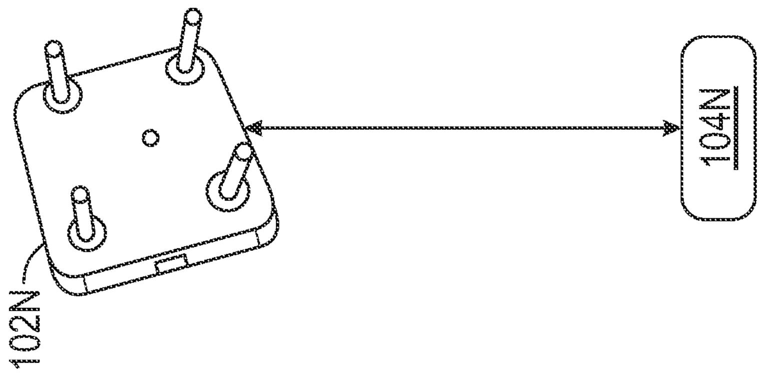
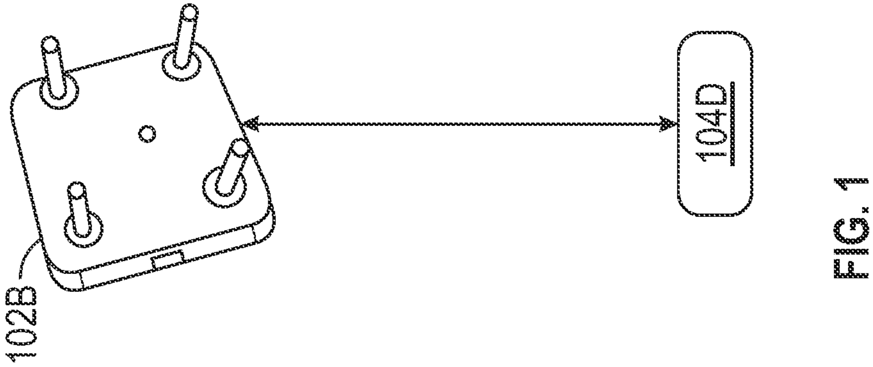
FIG. 1
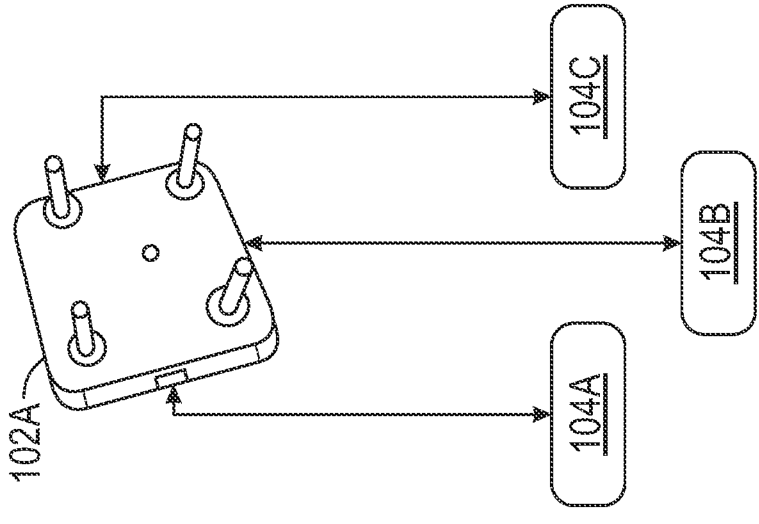

302
Start
402
STA generates request frame with QoS characteristics for flow
404
STA sends request frame to AP
End 302
Start
502
STA registers QoS profiles for flow
504
STA sends request QoS profile to AP
End 304
Start
602
AP establishes QoS status using STA request
604
AP responds to STA request frame indicating QoS status
End

STREAM CLASSIFICATION WITH MULTIPLE QUALITY TIERS

CROSS-REFERENCE TO RELATED APPLICATIONS

This application claims benefit of U.S. provisional patent application Ser. No. 63/615,654 filed Dec. 28, 2023. The aforementioned related patent application is herein incorporated by reference in its entirety.

TECHNICAL FIELD

Embodiments presented in this disclosure generally relate to wireless communication. More specifically, one or more embodiments disclosed herein relate to quality of service (QOS) for wireless communication.

BACKGROUND

The stream classification service (SCS) protocol includes a QoS characteristics element, which supports a single level of QoS for an SCS flow. But for modern applications (e.g., streaming video, video conferencing, augmented reality (AR) and virtual reality (VR) applications, and a wide variety of other applications), a single level of QoS is likely to be insufficient. For example, an application may support different quality tiers (e.g., different resolutions, color depths, frame rates, audio codecs, or other characteristics), particularly in response to congestion over the network. Existing SCS techniques do not support signaling of multiple QoS tiers for the same flow, and this makes it difficult for the network (e.g., a wireless access point (AP)) to balance the needs of its different flows (e.g., from different wireless stations (STAs)).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 1 illustrates a wireless networking environment for stream classification with multiple quality tiers, according to one embodiment.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 2:
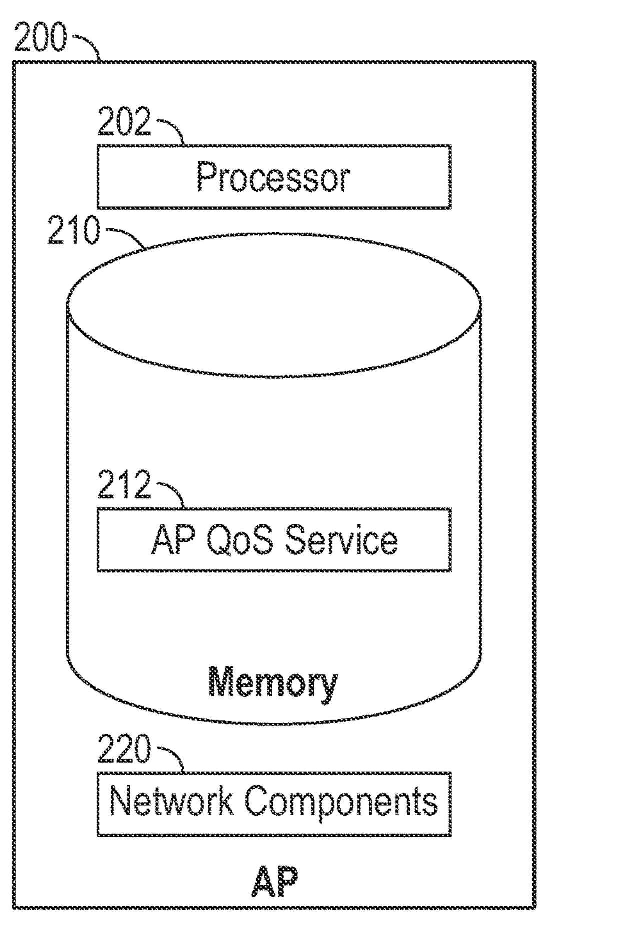
FIG. 2 is a block diagram illustrating an AP and an STA for stream classification with multiple quality tiers, according to one embodiment.
Figure 2:
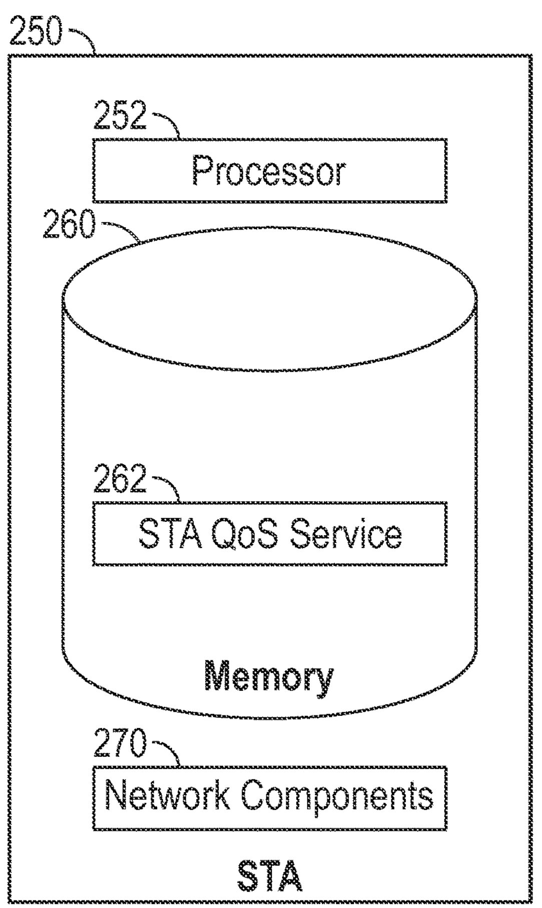

Embodiments include a method. The method includes identifying a plurality of quality of service (QOS) levels for an application flow between a wireless access point (AP) and a wireless station (STA), each of the QoS levels defining a plurality of QoS characteristics for the application flow. The method further includes establishing a first QoS level, of the plurality of QoS levels, for the application flow, based on the identified plurality of QoS levels. The method further includes modifying the QoS level for the application flow from the first QoS level to a second QoS level, of the plurality of QoS levels, based on selecting between the identified plurality of QoS levels.

Embodiments further include a system, including one or more processors and one or more memories storing a program, which, when executed on any combination of the one or more processors, performs operations. The operations include identifying a plurality of QoS levels for an application flow between an AP and an STA, each of the QoS levels defining a plurality of QoS characteristics for the application flow. The operations further include establishing a first QoS level, of the plurality of QoS levels, for the application flow, based on the identified plurality of QoS levels. The operations further include modifying the QoS level for the application flow from the first QoS level to a second QoS level, of the plurality of QoS levels, based on selecting between the identified plurality of QoS levels.

Embodiments further include a non-transitory computer-readable medium containing computer program code that, when executed by operation of one or more computer processors, performs operations. The operations include identifying a plurality of QoS levels for an application flow between an AP and an STA, each of the QoS levels defining a plurality of QoS characteristics for the application flow. The operations further include establishing a first QoS level, of the plurality of QoS levels, for the application flow, based on the identified plurality of QoS levels. The operations further include modifying the QoS level for the application flow from the first QoS level to a second QoS level, of the plurality of QoS levels, based on selecting between the identified plurality of QoS levels.

EXAMPLE EMBODIMENTS

One or more embodiments disclosed herein extend SCS to allow for multiple quality tiers for STAs. For example, STAs can signal the existence of multiple quality tiers, and the required QoS (e.g., SCS-level parameters such as minimum data rate, service internal, delay bound loss rate, and other suitable parameters) for each tier. An AP can then dynamically switch QoS, as necessary or available, based on the allowed quality tiers. This is discussed further, below, with regard to FIGS. 3-4, 6, and 8. Further, in one embodiment, an STA can register multiple QoS profiles, allowing an AP to switch among profiles as necessary (e.g., based on network congestion), and the STA can dynamically indicate that an AP should switch profiles. This is discussed further, below, with regard to FIGS. 3, 5, 7, and 9.

On or more of these embodiments has numerous technical advantages. For example, knowing in advance the various quality tiers or QoS profiles (e.g., to support varying resolutions of streaming video) can allow an AP to proactively reserve resources (e.g., virtual resources), particularly for peak or worst case scenarios. This is a significant advantage over existing solutions, which describe at most one level of QoS for a flow (e.g., an SCS flow).

Further, providing for multiple quality tiers or QoS profiles can significantly streamline and improve switching QoS levels, both by reducing needed signaling and allow for more efficient and rapid switching (e.g., because an AP can proactively reserve suitable resources). For example, at the AP resources (e.g., virtual resources) could be allocated but not assigned for different quality tiers or QoS profiles. For example, an AP could allocate time-slots for various video or audio codecs (e.g., periods, number of resources units (RUs), etc.) in the AP's scheduler but not assign the timeslots (e.g., not commit or start triggering the time slots), until the profile or QoS tier is selected or activated.

FIG. 1 illustrates a wireless networking environment 100 for stream classification with multiple quality tiers, according to one embodiment. In an embodiment, the environment 100 includes a number of APs 102A-N. Each of the APs is associated with one or more STAs 104A-N. The APs 102A-N are examples of infrastructure entities in the wireless networking environment 100*d*, but any suitable infrastructure entities can be used. The STAs 104A-N are examples of client entities in the wireless networking environment 100, but any suitable client entities can be used. Further, each of the STAs 104A-N can be any suitable wireless device, including a laptop computer, a desktop computer, a smartphone, a tablet, an internet of things (IoT) device, a vehicle, another suitable user device, or a wireless network infrastructure device (e.g., a wireless access point (AP)).

In an embodiment, one or more of the STAs 104A-N can use SCS to communicate with an associated AP (e.g., to allow for QoS management). For example, the STA 104A could be a smartphone associated with the AP 102A. The STA 104A can be operating a video streaming application, and can use SCS to identify QoS characteristics for traffic flows. For example, the STA 104A can use a QoS characteristics element in SCS to define a single set of QoS parameters (e.g., minimum data rate, reliability at delay bound, service interval, and other suitable parameters) for a given flow.

In an embodiment, the STA 104A can further provide for multiple QoS levels for a given traffic flow. For example, the STA 104A can indicate multiple quality tiers, with associated QoS characteristics, for a given SCS flow. This can include registering multiple profiles. The STA 104A, AP 102A, or both, can then dynamically trigger a swap (e.g., between quality tiers or QoS profiles). This is discussed further, below, with regard to FIGS. 3-9. For example, the STA 104A can provide to the AP 102A proposed quality tiers, with QoS characteristics, for a flow (e.g., an SCS flow. The AP 102A can select a suitable tier for initial operation, and then can dynamically modify the tier (e.g., based on network conditions). This is discussed further, below, with regard to FIGS. 3-4, 6, and 8. As another example, the STA 104A can register with the AP 102A a number of QoS profiles for a given flow (e.g., a given SCS flow). The STA 104A can then dynamically indicate to the AP 102A that the profile should be swapped for the flow. This is discussed further, below, with regard to FIGS. 3, 5, 7, 9, and 10A-B.

FIG. 2 is a block diagram illustrating an AP 200 and an STA 250 for stream classification with multiple quality tiers, according to one embodiment. In an embodiment, the AP 200 can correspond with any of the APs 102A-N illustrated in FIG. 1, and the STA 250 can correspond with any of the STAs 104A-N illustrated in FIG. 1.

The AP 200 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the AP to interface with a communication network, as discussed above in relation to FIG. 1. For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the AP 200. The program code is generally described as various functional "applications" or "modules" within the memory 210, although alternate implementations may have different functions and/or combinations of functions. Within the memory 210, the AP QoS service 212 facilitates stream classification with multiple quality tiers. This is discussed further, below, with regard to FIGS. 3-9. Further, using an AP 200 for stream classification with multiple quality tiers is merely one example. Alternatively, or in addition, any other network device (e.g., a wireless local area network (WLAN) controller (WLC) or another network component) can be used.

The STA 250 includes a processor 252, a memory 260, and network components 270. The processor 252 generally retrieves and executes programming instructions stored in the memory 260. The processor 252 is representative of a single CPU, multiple CPUs, a single CPU having multiple processing cores, graphics processing units (GPUs) having multiple execution paths, and the like.

The network components 270 include the components necessary for the STA 250 to interface with a communication network, as discussed above in relation to FIG. 1. For example, the network components 270 can include wired, WiFi, or cellular network interface components and associated software. Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory.

The memory 260 generally includes program code for performing various functions related to use of the STA 250. The program code is generally described as various functional "applications" or "modules" within the memory 260, although alternate implementations may have different functions and/or combinations of functions. Within the memory 260, the STA QoS service 262 facilitates stream classification with multiple quality tiers. This is discussed further, below, with regard to FIGS. 3-9. Further, using an STA 250 for stream classification with multiple quality tiers is merely one example. Alternatively, or in addition, any other network device (e.g., the AP 200, a WLC or another network component, or any suitable combination) can be used.

Figure 3:
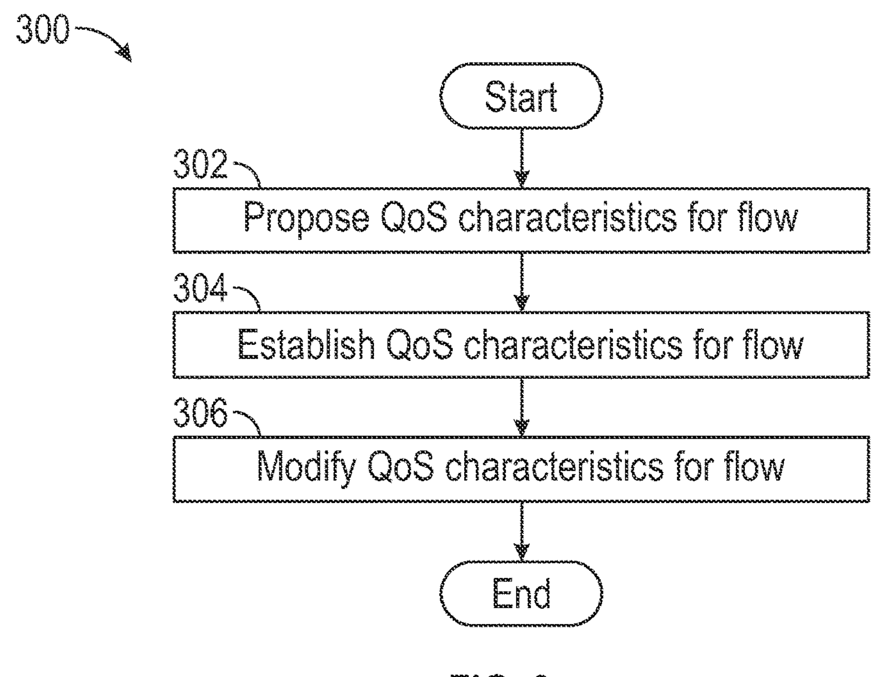
FIG. 3 is a flowchart illustrating stream classification with multiple quality tiers, according to one embodiment.

FIG. 3 is a flowchart 300 illustrating stream classification with multiple quality tiers, according to one embodiment. At block 302, an STA QoS service (e.g., the STA QOS service 262 illustrated in FIG. 2) proposes QoS characteristics for a flow. For example, an STA QoS service can generate a request frame with QoS characteristics for a flow, and send the request frame to an AP. This is discussed further, below, with regard to FIG. 4. Alternatively, or in addition, an STA QoS service can register QoS profiles for a flow and send the AP s request for a particular profile. This is discussed further, below, with regard to FIG. 5.

At block 304, an AP QoS service (e.g., the AP QoS service 212 illustrated in FIG. 2) establishes QoS characteristics for the flow. For example, the AP QoS service can establish QoS status using the STA request, and can respond to the STA request indicating the established status. This is discussed further, below, with regard to FIG. 6. Alternatively, or in addition, the AP QoS service can establish the QoS based on the identified profile from the STA. This is discussed further, below, with regard to FIG. 7.

At block 306, a QoS service (e.g., the AP QOS service, the STA QoS service, or a combination of both) modifies QoS characteristics for the flow. For example, the AP QoS service can dynamically select a different QoS tier for the flow, and can notify the STA of the change. This is discussed further, below, with regard to FIG. 8. Alternatively, or in addition, the STA QoS service can send a QoS modify request with a new profile identifier, to the AP. The AP QoS can then activate the new profile based on the modify request. This is discussed further, below, with regard to FIG. 9.

Figures 4, 5, 6:
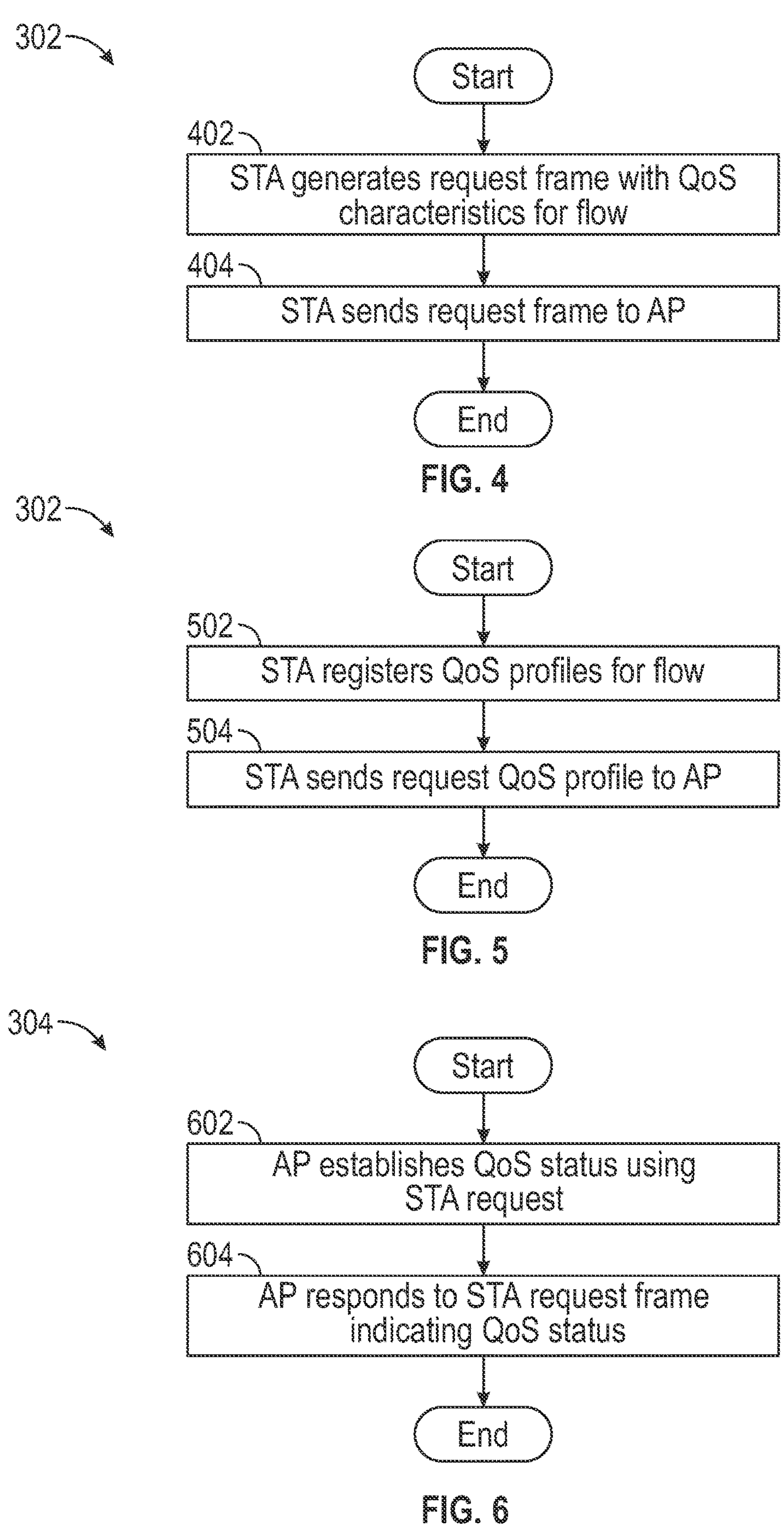
FIG. 4 is a flowchart illustrating proposing QoS characteristics for a flow as part of stream classification with multiple quality tiers, according to one embodiment.
FIG. 5 is a flowchart further illustrating proposing QoS characteristics for a flow as part of stream classification with multiple quality tiers, according to one embodiment.
FIG. 6 is a flowchart illustrating establishing QoS characteristics for a flow as part of stream classification with multiple quality tiers, according to one embodiment.

FIG. 4 is a flowchart illustrating proposing QoS characteristics for a flow as part of stream classification with multiple quality tiers, according to one embodiment. In an embodiment, FIG. 4 illustrates one embodiment corresponding to block 302 illustrated in FIG. 3, above. At block 402 an STA QoS service (e.g., the STA QoS service 262 illustrated in FIG. 2) generates a request frame (e.g., an SCS with QoS characteristics for a flow (e.g., an SCS flow).

In an embodiment, the STA QoS service generates a request frame (e.g., an SCS request frame) with a descriptor (e.g., one or more SCS descriptors) that describes the QoS characteristics of suitable quality tiers (e.g., preferred quality tiers, all available quality tiers, or any other collection of one or more quality tiers). For example, the STA QoS service can assign each quality tier a tier identifier (e.g., for use in subsequent signaling). The STA QoS service can further indicate the STA's relative preference for each tier in the descriptor. For example, the STA QoS service can indicate an order of preference, desirability or undesirability of a particular tier (e.g., as a value, a field (e.g., a 2, 4, or 8 bit field) or using any other suitable technique), or any other relative preference.

Further, in an embodiment, the STA QoS service can indicate whether a given quality tier is required (e.g., a "hard" service level agreement (SLA)) or desired (e.g., a "soft" SLA). For example, the STA QOS service can indicate a hard-SLA-only requirement, meaning the receiving AP should either accommodate the requested QoS tier (e.g., the requested level of service reflected by the QoS characteristics for that tier) or reject the request.

As another example, the STA QoS service can indicate a hard-SLA-else-soft-SLA requirement. In this circumstance, the AP should attempt to accommodate the hard SLA tier level. If that is not available, the AP may accommodate the soft SLA tier level. But if that soft SLA tier level is not available, the AP should reject the request. As a third example, the STA QoS service can indicate a hard-SLA-else-soft-SLA-else-no-SLA. In this circumstance, the AP should first attempt to accommodate the hard SLA tier level, and if that is not available should attempt to accommodate the soft SLA tier level. But if neither is available, the AP may accept the request with no SLA tier level (e.g., as opposed to a hard-SLA-else-soft-SLA requirement in which the AP must accommodate either the hard or soft SLA QoS tier, or reject the request).

In an embodiment, the SLA type can be orthogonal to the quality level and requested separately via its own element, or can be combined with the quality level. For example, if the SLA type request is combined with the quality level, then the SLA type request can be added to each descriptor (e.g., as a subfield in a QoS characteristics element). This allows for multiple sub-elements describing different quality tiers, along with SLA preferences.

A concrete example may be useful to help explain. For example, the STA QoS service can generate a request frame that indicates any of the following:

1. SCS-level parameters for a high QoS (e.g., to support a 4K video flow) with hard SLA; else
2. SCS-level parameters for a middle QoS (e.g., to support a 2K video flow) with hard SLA; else
3. SCS-level parameters for a lower QoS (e.g., to support a 1K video flow) with hard SLA; else
4. SCS-level parameters for a high QoS (e.g., to support a 4K video flow) with hard SLA if possible and otherwise soft SLA; else
5. SCS-level parameters for a middle QoS (e.g., to support a 2K video flow) with hard SLA if possible and otherwise soft SLA; else
6. SCS-level parameters for a lower QoS (e.g., to support a 1K video flow) with hard SLA if possible and otherwise soft SLA; else
7. SCS-level parameters for a high QoS (e.g., to support a 4K video flow) with hard SLA if possible and otherwise soft SLA if possible and otherwise no SLA; else
8. SCS-level parameters for a middle QoS (e.g., to support a 2K video flow) with hard SLA if possible and otherwise soft SLA if possible and otherwise no SLA; else
9. SCS-level parameters for a lower QoS (e.g., to support a 1K video flow) with hard SLA if possible and otherwise soft SLA if possible and otherwise no SLA. These are merely examples, and the STA QoS service can generate any suitable request frame.

At block 404, the STA QoS service sends the request frame to the AP. For example, the STA QoS service can send an SCS request frame (e.g., including suitable SCS descriptors as described above) to an associated AP. This is merely an example, and the STA QoS service can send the request frame to any suitable network component (e.g., a WLC, another suitable controller, or any other suitable component).

FIG. 5 is a flowchart further illustrating proposing QoS characteristics for a flow as part of stream classification with multiple quality tiers, according to one embodiment. In an embodiment, FIG. 5 illustrates another technique corresponding with block 302 illustrated in FIG. 3 (e.g., in addition to, or instead of, the technique illustrated in FIG. 4). At block 502, an STA QoS service (e.g., the STA QoS service 262 illustrated in FIG. 2) registers QoS profiles for a flow (e.g., an SCS flow).

In an embodiment, the STA QoS service registers multiple QoS profiles for a given application flow (e.g., with the AP or any other suitable network component). For example, the STA QOS service can transmit a single SCS request frame that includes a separate descriptor (e.g., a separate QoS characteristics element) for each QoS profile for the same SCS ID.

As one example, if a video streaming application supports multiple video resolutions (e.g., 8K, 4K, 2K and 1K), the STA QoS service can register four QoS profiles for that application flow by including four QoS characteristics elements for the same SCS ID (and traffic classification (TCLAS) or fully qualified domain name (FQDN), if included). Each QoS characteristics element can specify QoS characteristics for the corresponding profile (e.g., a minimum data rate requirement, other traffic characteristics, or any other suitable QoS characteristics). In an embodiment, an SCS descriptor element can include more than one QoS characteristics elements, to support registering multiple profiles.

Further, each QoS profile for a given stream (e.g., a given SCS stream or SCS ID) can be identified by a suitable identifier (e.g., a QoS profile ID). In an embodiment, the STA QoS service also indicates an initial QoS profile (e.g., an initial desired QoS profile). For example, if a video streaming application wants to activate a profile to support 2K video, out of four possible profiles, the STA QoS can indicate that as the desired profile in the request (e.g., SCS request).

At block 504, the STA QoS service sends the requested QoS profile to the AP. For example, the STA QoS service can send an SCS request frame (e.g., including suitable SCS descriptors as described above) to an associated AP. This is merely an example, and the STA QoS service can send the request frame to any suitable network component (e.g., a WLC, another suitable controller, or any other suitable component).

FIG. 6 is a flowchart illustrating establishing QoS characteristics for a flow as part of stream classification with multiple quality tiers, according to one embodiment. In an embodiment, FIG. 6 corresponds with block 304 illustrated in FIG. 3. At block 602, an AP QoS service (e.g., the AP QOS service 212 illustrated in FIG. 2) establishes a QoS status using the STA request (e.g., discussed above in relation to FIGS. 3-5).

In one embodiment, the AP QoS service applies its admission control policy (if such a policy exists) and accepts or denies one tier (e.g., identified by its tier ID) from a requested SCS descriptor that includes multiple quality tiers (e.g., quality and SLA tiers, as discussed above in relation to block 402 illustrated in FIG. 4). Alternatively, or in addition, the AP QoS service records all the quality (or quality and SLA) tiers. The AP QoS service can then apply its admission control policy (again, assuming one exists), and accepts a particular tier (e.g., identified by Tier ID) or rejects all the tiers.

At block 604 the AP QoS service responds to the STA request frame indicating the QoS status. In an embodiment, the AP QoS service transmits a status frame (e.g., an SCS status frame) to the STA. For example, a typical SCS status duple is 3 octets long, including an SCS ID and two octets of status information. But the acceptance of a specific quality tier requires more information per SCS ID. This can be implemented using any of a number of suitable techniques. For example, a new frame could be defined to provide the additional information. Alternatively, the existing SCS status frame could be used, with a special continuation, or overlength, SCS ID defined (e.g., 255 or all 1s). This special SCS ID could be used to indicate that the response includes additional octets (e.g., in groups of three plus three) and indicates a response spanning 3+3 octets.

Thus, an SCS status frame could include: actual-SCS-ID (1 octet)+status-code (2 octets)+continuation/overlength-indicator (e.g., SCS ID=255) (1 octet)+tier-ID (of selected quality tier)+reserved bits (2 octets). This is merely an example, and any suitable order, sizing, and sub-ordering could be used.

Figures 7, 8, 9:
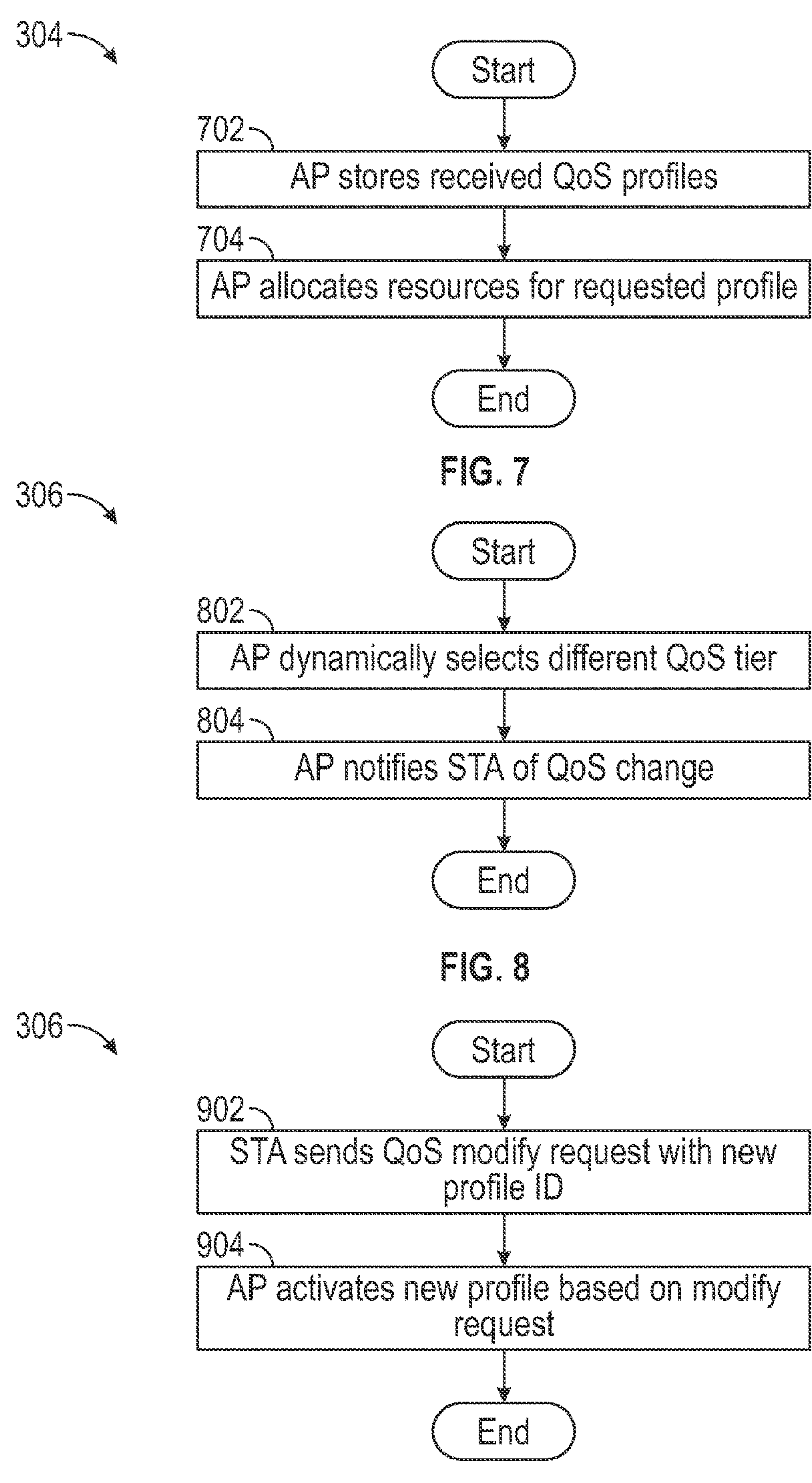
FIG. 7 is a flowchart further illustrating establishing QoS characteristics for a flow as part of stream classification with multiple quality tiers, according to one embodiment.
FIG. 8 is a flowchart illustrating modifying QoS characteristics for a flow as part of stream classification with multiple quality tiers, according to one embodiment.
FIG. 9 is a flowchart further illustrating modifying QoS characteristics for a flow as part of stream classification with multiple quality tiers, according to one embodiment.

FIG. 7 is a flowchart further illustrating establishing QoS characteristics for a flow as part of stream classification with multiple quality tiers, according to one embodiment. In an embodiment, FIG. 7 illustrates another technique corresponding with block 304 illustrated in FIG. 3 (e.g., in addition to, or instead of, the technique illustrated in FIG. 6).

At block 702, an AP QoS service (e.g., the AP QOS service 212 illustrated in FIG. 2) stores received QoS profiles. In an embodiment, when an AP receives an SCS request which indicates multiple QoS profiles for an application flow, the AP QoS service maintains those received QoS profiles for the flow. The AP QoS service can maintain those profiles in any suitable location, including local storage or any suitable remote storage location.

At block 704, the AP QoS service allocates resources for the requested profile. In an embodiment, the AP QoS service can allocate resources for the flow based on the QoS profile signaled for activation for a given SCS stream. These resources can later be modified by switching profiles, as discussed below in relation to FIG. 9.

FIG. 8 is a flowchart illustrating modifying QoS characteristics for a flow as part of stream classification with multiple quality tiers, according to one embodiment. In an embodiment, FIG. 8 corresponds with block 306 illustrated in FIG. 3. At block 802, an AP QoS service (e.g., the AP QOS service 212 illustrated in FIG. 2) dynamically selects a different QoS tier.

In an embodiment, as higher priority flows start and stop, and available resources rise and fall (e.g., due to interference or other network conditions changing over time), the AP QOS service admission control (e.g., per BSS, per wireless neighborhood, per network segment including switching and routing or a software defined wide area network (SDWAN), or any other suitable admission control) can dynamically select a different tier ID. For example, available tier IDs can be supplied by the STA in the request frame, as discussed above in relation to block 402 illustrated in FIG. 4. The AP QOS service can change tier IDs, within permitted options.

At block 804, the AP QOS service notifies the STA of the QoS change. For example, the AP can transmit to the STA an unsolicited SCS response with the new tier ID, and status, for the SCS ID. This is merely an example, and the AP QoS service can notify the STA using any suitable technique.

FIG. 9 is a flowchart further illustrating modifying QoS characteristics for a flow as part of stream classification with multiple quality tiers, according to one embodiment. In an embodiment, FIG. 9 illustrates another technique corresponding with block 306 illustrated in FIG. 3 (e.g., in addition to, or instead of, the technique illustrated in FIG. 8).

At block 902, an STA QoS service (e.g., the STA QoS service 262 illustrated in FIG. 2) sends a QoS modify request with a new profile ID. In an embodiment, when an application adapts its throughput (e.g., because of changing network conditions or for other reasons), the STA QoS service can send a modify request (e.g., an SCS request with "modify" for the SCS ID) to indicate the QoS profile ID which needs to be activated for the flow, to match the changed requirement.

In an embodiment, the STA QoS service does not need to provide the complete traffic characteristics again associated with the QoS profile to be activated (e.g., because the STA QoS service already provided this information when registering the profile, as discussed above in relation to block 502 illustrated in FIG. 5). In another embodiment, the STA QoS service can provide an updated set of traffic characteristics for the indicated QoS profile, if profile requirements have changed.

At block 904, an AP QoS service (e.g., the AP QOS service 212 illustrated in FIG. 2) activates the new profile based on the modify request. In an embodiment, upon receiving an SCS request with "modify" for an existing SCS ID, the AP QoS activates the new QoS profile for the flow and modifies its resource allocation for the SCS stream based on the traffic characteristics for the newly activated QoS profile. The profile information can be previously registered with the AP, or provided in the SCS "modify" request.

In an embodiment, if the AP QoS cannot assign the resources for the new QoS profile requested for activation (e.g. not enough resources are available to active the new QoS profile), the AP QoS service can send a failure message to the STA. For example, the AP QOS service can transmit to the STA a message indicating the failure. The AP QoS service can then keep the prior QoS profile activated (e.g., until explicitly terminated by the STA or the AP, or for any other suitable duration).

While FIG. 9 contemplates an STA requesting QoS modification, this is merely an example. Alternatively, or in addition, the STA can receive signaling from the AP to modify its QoS profile for an SCS stream. This can allow the AP to trigger explicit modification to the QoS profile used by an application based on the resource availability at the AP. For example, the AP can signal to modify QoS Profile from a higher QoS level (e.g., sufficient to support 4K video) to a lower QoS level (e.g., sufficient to support 2K video) for a given SCS ID, when resource availability goes down. The AP can then trigger a change of the QoS profile back to the higher QoS level when resources become available again.

In an embodiment, this approach can use same signaling mechanism discussed below in relation to FIGS. 10A-B to signal which QoS profile should be activated or used by the application in an unsolicited SCS Response message sent by the AP, which includes a QoS characteristics element indicating the intended QoS profile. Upon receiving the message from the AP, the STA can indicate to the application layer the new QoS profile which should be used by the application flow (e.g., through an application programming interface (API) notification).

Figure 10A:
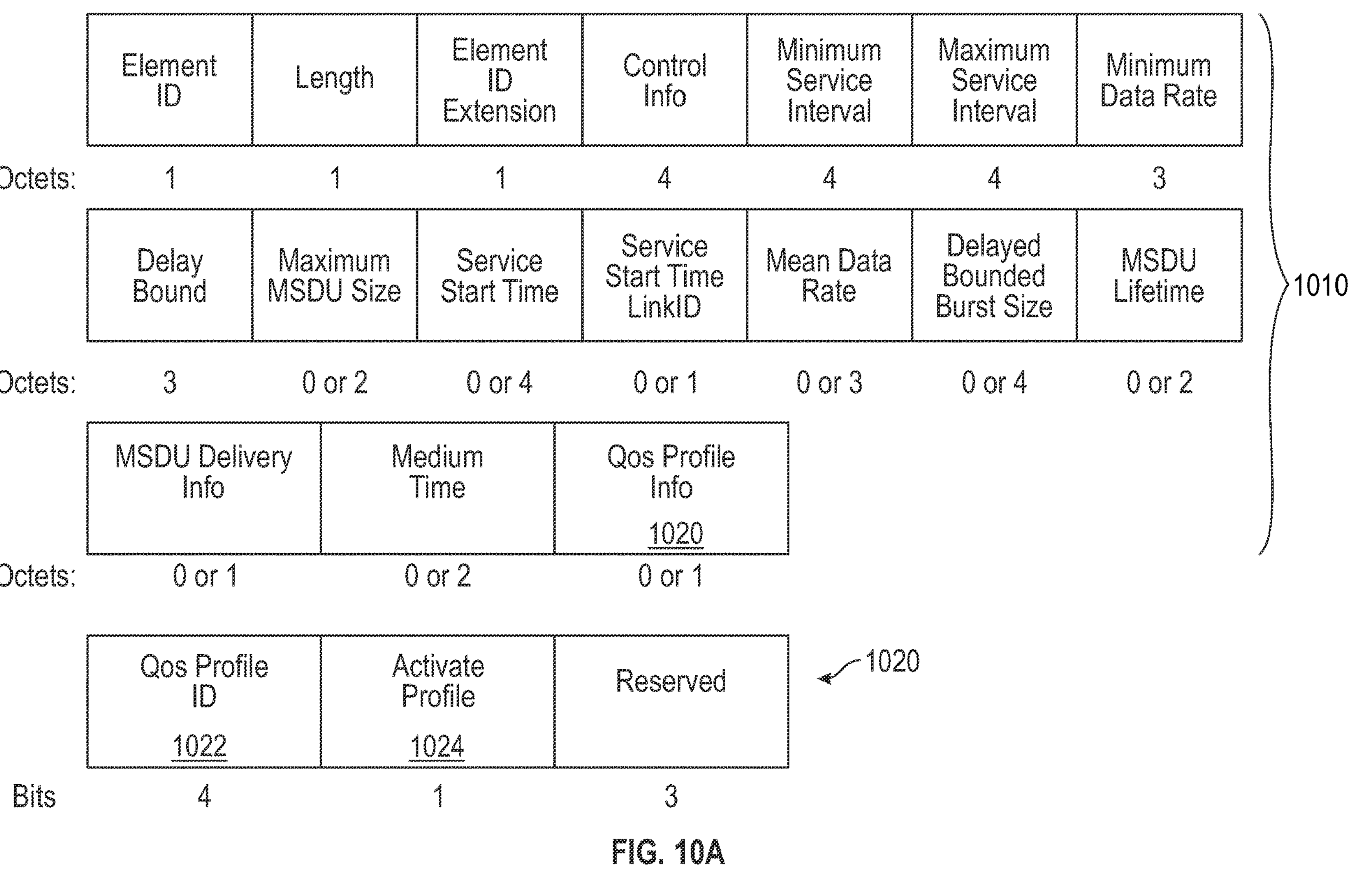
FIGS. 10A-B illustrate formats for identification of QoS characteristics for a flow as part of stream classification with multiple quality tiers, according to one embodiment.
Figure 10B:
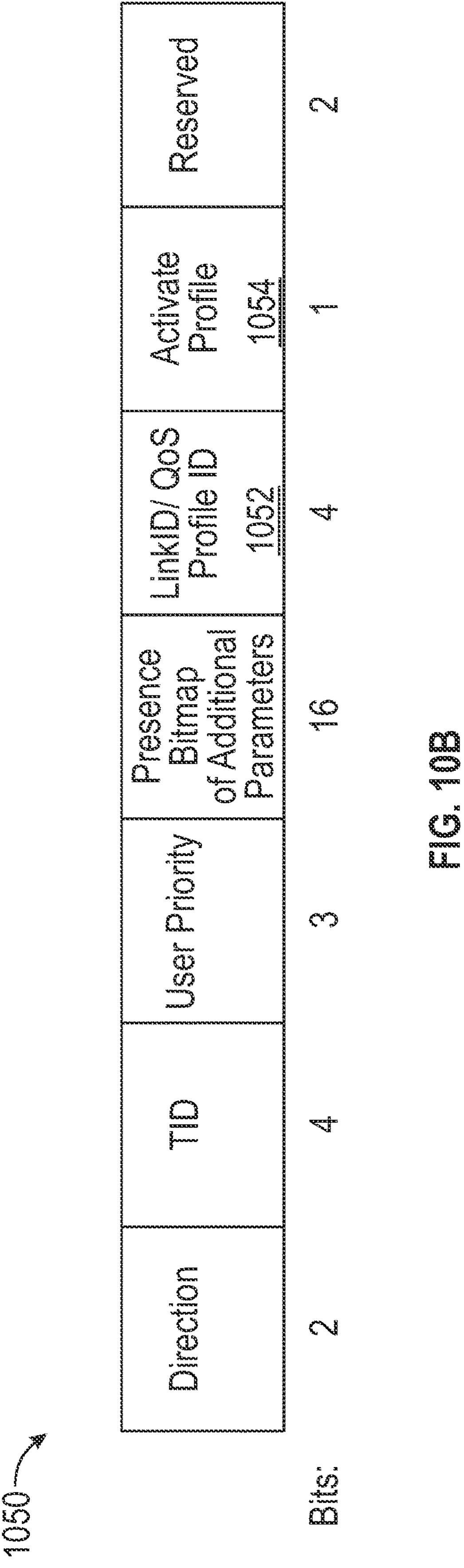

FIGS. 10A-B illustrate formats for identification of QoS characteristics for a flow as part of stream classification with multiple quality tiers, according to one embodiment. For example, FIGS. 10A-B provide example embodiments to register and select QoS profiles for a given flow, as discussed above in relation to FIGS. 5, 7, and 9. This is merely an example, and these examples can also be used to provide any suitable flow QoS characteristics (e.g., as discussed above in relation to FIGS. 4, 6, and 8). Further, these are merely examples and any suitable techniques can be used.

In an embodiment, an STA QoS service (e.g., the STA QoS service 262 illustrated in FIG. 2), an AP QOS service (e.g., the AP QoS service 212 illustrated in FIG. 2), or both, indicate support for QoS profiles through a capability bit (e.g., a capability bit in the extended multi-link device (MLD) capabilities and operations field in a basic multi-link (ML) element). Further, profile information can be provided through suitable signaling (e.g., from an STA to an AP).

FIG. 10A illustrates one example of potential signaling. In an embodiment a QoS characteristics element 1010 can include numerous octets with a variety of data, including a variety of data describing characteristics for a media access control (MAC) service data unit (MSDU). A new QoS profile info field 1020 can be added to the QoS characteristics element 1010.

For example, the QoS profile info filed 1020 can be an optional field, and can include a QoS profile ID 1022 (e.g., a four bit field to support up to 16 QoS profiles for each SCS stream). Further, the QoS profile info field 1020 can also include an activate-profile bit 1024, indicating which of the profiles included should be activated currently. In an embodiment, the presence of the QoS profile info field 1020 can be indicated using a suitable existing technique, including using the Presence Bitmap Of Additional Parameters subfield in the Control Info field, and setting the bit corresponding to the QoS Profile Info field to 1.

FIG. 10B illustrates another example 1050 of potential signaling for QoS profile information. An element 1050 (e.g., a QoS characteristics element) includes linkID field 1052 (e.g., defined currently for direct or peer-to-peer (P2P) links in the control info field). The linkID field 1052 can be repurposed as a QoS profile ID. One of the reserved bits 1054 in the control info can be used to indicate "Activate Profile". In an embodiment, The "Activate Profile" bit 1054 is set to 1 for the QoS profile that needs to be activated, and is set to 0 for all other QoS profiles included for the SCS ID.

As noted above, FIGS. 10A and 10B merely illustrate examples for signaling. Alternatively, or in addition, a new activate profile sub-element can be defined and included in the SCS descriptor element outside the QoS characteristics elements in the SCS request, to indicate the QoS profile which should be activated for the SCS stream indicated by the SCS ID. The Activate profile sub-element indicates the QoS profile ID that needs to be activated for the SCS stream.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:

identifying a plurality of quality of service (QoS) levels for an application flow between a wireless access point (AP) and a wireless station (STA), each of the QoS levels defining a plurality of QoS characteristics for the application flow, wherein the identifying comprises receiving, at the AP, a frame transmitted by the STA indicating the plurality of QoS levels, the frame further indicating an order of preference among the plurality of QoS levels;

reserving one or more virtual resources for the plurality of QoS levels;

subsequent to reserving the one or more virtual resources, establishing a first QoS level, of the plurality of QoS levels, for the application flow, based on the identified plurality of QoS levels; and modifying the QoS level for the application flow from the first QoS level to a second QoS level, of the plurality of QoS levels, based on selecting between the identified plurality of QoS levels.

2. The method of claim 1, wherein the application flow comprises a stream classification service (SCS) flow.

3. The method of claim 2, wherein the identifying the plurality of QoS levels for the application flow comprises:

registering at the AP a plurality of QoS profiles for the application flow, wherein each of the plurality of QoS levels corresponds to a respective QoS profile of the plurality of QoS profiles.

4. The method of claim 3, wherein establishing the first QoS level, of the plurality of QoS levels, for the application flow, based on the identified plurality of QoS levels comprises:

receiving at the AP, from the STA, an indication of selection of a first QoS profile corresponding with the first QoS level.

5. The method of claim 2, wherein modifying the QoS level for the application flow from the first QoS level to the second QoS level, of the plurality of QoS levels, based on selecting between the identified plurality of QoS levels, comprises:

determining at the AP to swap from the first QoS level to the second QoS level based on one or more network characteristics.

6. The method of claim 2, wherein modifying the QoS level for the application flow from the first QoS level to the second QoS level, of the plurality of QoS levels, based on selecting between the identified plurality of QoS levels, comprises:

receiving at the AP a message indicating a request by the STA to swap from the first QoS level to the second QoS level.

7. The method of claim 1, wherein the frame further indicates a service level agreement (SLA) requirement for one or more of the plurality of QoS levels.

8. The method of claim 1, wherein establishing the first QoS level, of the plurality of QoS levels, for the application flow, based on the identified plurality of QoS levels comprises:

selecting, at the AP, the first QoS level from among the identified plurality of QoS levels based on one or more network characteristics.

9. A system, comprising:

one or more processors; and one or more memories storing a program, which, when executed on any combination of the one or more processors, performs operations, the operations comprising:

identifying a plurality of quality of service (QoS) levels for an application flow between a wireless access point (AP) and a wireless station (STA), each of the QoS levels defining a plurality of QoS characteristics for the application flow, wherein the identifying comprises receiving, at the AP, a frame transmitted by the STA indicating the plurality of QoS levels, the frame further indicating an order of preference among the plurality of QoS levels;

reserving one or more virtual resources for the plurality of QoS levels;

subsequent to reserving the one or more virtual resources, establishing a first QoS level, of the plurality of QoS levels, for the application flow, based on the identified plurality of QoS levels; and modifying the QoS level for the application flow from the first QoS level to a second QoS level, of the plurality of QoS levels, based on selecting between the identified plurality of QoS levels.

10. The system of claim 9, wherein the application flow comprises a stream classification service (SCS) flow.

11. The system of claim 10, wherein the frame further indicates a service level agreement (SLA) requirement for one or more of the plurality of QoS levels.

12. The system of claim 10, wherein establishing the first QoS level, of the plurality of QoS levels, for the application flow, based on the identified plurality of QoS levels comprises:

selecting, at the AP, the first QoS level from among the identified plurality of QoS levels based on one or more network characteristics.

13. The system of claim 10, wherein the identifying the plurality of QoS levels for the application flow comprises:

registering at the AP a plurality of QoS profiles for the application flow, wherein each of the plurality of QoS levels corresponds to a respective QoS profile of the plurality of QoS profiles; and wherein modifying the QoS level for the application flow from the first QoS level to the second QoS level, of the plurality of QoS levels, based on selecting between the identified plurality of QoS levels, comprises:

receiving at the AP a message indicating a request by the STA to swap from the first QoS level to the second QoS level.

14. A non-transitory computer-readable medium containing computer program code that, when executed by operation of one or more computer processors, performs operations comprising:

identifying a plurality of quality of service (QoS) levels for an application flow between a wireless access point (AP) and a wireless station (STA), each of the QoS levels defining a plurality of QoS characteristics for the application flow, wherein the identifying comprises receiving, at the AP, a frame transmitted by the STA indicating the plurality of QoS levels, the frame further indicating an order of preference among the plurality of QoS levels;

reserving one or more virtual resources for the plurality of QoS levels;

subsequent to reserving the one or more virtual resources, establishing a first QoS level, of the plurality of QoS levels, for the application flow, based on the identified plurality of QoS levels; and modifying the QoS level for the application flow from the first QoS level to a second QoS level, of the plurality of QoS levels, based on selecting between the identified plurality of QoS levels.

15. The non-transitory computer-readable medium of claim 14, wherein the application flow comprises a stream classification service (SCS) flow.

16. The non-transitory computer-readable medium of claim 15, the frame further indicates a service level agreement (SLA) requirement for one or more of the plurality of QoS levels.

17. The non-transitory computer-readable medium of claim 15, wherein establishing the first QoS level, of the plurality of QoS levels, for the application flow, based on the identified plurality of QoS levels comprises:

selecting, at the AP, the first QoS level from among the identified plurality of QoS levels based on one or more network characteristics.

18. The non-transitory computer-readable medium of claim 15, wherein the identifying the plurality of QoS levels for the application flow comprises:

registering at the AP a plurality of QoS profiles for the application flow, wherein each of the plurality of QoS levels corresponds to a respective QoS profile of the plurality of QoS profiles; and wherein modifying the QoS level for the application flow from the first QoS level to the second QoS level, of the plurality of QoS levels, based on selecting between the identified plurality of QoS levels, comprises:

receiving at the AP a message indicating a request by the STA to swap from the first QoS level to the second QoS level.

* * * * *